US009795995B2

(12) United States Patent
Zimmer et al.

(10) Patent No.: US 9,795,995 B2
(45) Date of Patent: Oct. 24, 2017

(54) HIGH-SPEED, DUAL-SIDED SHOE SORTER WITH OFFSET INDUCT

(71) Applicant: Intelligrated Headquarters, LLC, Mason, OH (US)

(72) Inventors: Justin J. Zimmer, Dayton, OH (US); Jacob D. Wieneke, Liberty Township, OH (US); Anthony J. Turco, Hamilton, OH (US); William M. Saurber, III, Hamilton, OH (US); Aaron K. Hunter, Covington, KY (US); John Williams Rugh, Terrace Park, OH (US); Timothy A. Koeninger, Alexandria, KY (US); Matthew Ryan Otto, Fairfield, OH (US); Jarl Nicholas Sebastian, Trenton, OH (US)

( * ) Notice: Subject to any disclaimer, the term of this patent is extended or adjusted under 35 U.S.C. 154(b) by 0 days.

(21) Appl. No.: 15/147,475

(22) Filed: May 5, 2016

(65) Prior Publication Data

US 2016/0325315 A1 Nov. 10, 2016

Related U.S. Application Data

(60) Provisional application No. 62/157,501, filed on May 6, 2015, provisional application No. 62/308,401, filed on Mar. 15, 2016.

(51) Int. Cl.
*B65G 47/10* (2006.01)
*B07C 3/06* (2006.01)
*B07C 5/36* (2006.01)
*B65G 47/46* (2006.01)
*B65G 47/76* (2006.01)

(52) U.S. Cl.
CPC ............... *B07C 3/06* (2013.01); *B07C 5/36* (2013.01); *B65G 47/46* (2013.01); *B65G 47/766* (2013.01)

(58) Field of Classification Search
CPC .... B65G 47/46; B65G 47/766; B65G 47/844; B65G 2207/36; B65G 43/00; B07C 3/06; B07C 5/36
USPC ............. 198/370.02, 370.03, 370.07, 349
See application file for complete search history.

(56) References Cited

U.S. PATENT DOCUMENTS

| | | | | |
|---|---|---|---|---|
| 3,361,247 A | * | 1/1968 | Lauzon | B65G 47/496 198/350 |
| 4,711,341 A | * | 12/1987 | Yu | B65G 47/844 198/370.02 |
| 4,717,011 A | * | 1/1988 | Yu | B65G 47/844 198/370.02 |
| 4,732,259 A | | 3/1988 | Yu et al. | |
| 4,884,677 A | * | 12/1989 | Yu | B65G 47/844 198/370.02 |

(Continued)

*Primary Examiner* — William R Harp

(57) ABSTRACT

A sortation conveyor has an endless apron supported for longitudinal movement on an elongate frame. An induction conveyor deposits articles on an offset lateral portion of a top conveying run of the apron. A pin guide assembly is coupled between the elongate frames and is upwardly presented to selectively receive the pin of pushers that laterally move across the apron. An upstream pre-sort section thereof positions articles from the offset lateral portion to an opposite lateral portion of the top conveying run. A downstream divert section of the pin guide assembly selectively diverts the articles to a divert target on the corresponding lateral side to the selected one of offset lateral position and the opposite lateral position.

16 Claims, 14 Drawing Sheets

(56) References Cited

U.S. PATENT DOCUMENTS

| | | | | |
|---|---|---|---|---|
| 5,613,591 A | * | 3/1997 | Heit | B65G 47/844 |
| | | | | 198/370.02 |
| 6,478,144 B1 | * | 11/2002 | Sweazy | B07C 3/065 |
| | | | | 198/370.02 |
| 7,516,835 B2 | * | 4/2009 | Neiser | B65G 47/844 |
| | | | | 198/370.02 |
| 9,038,809 B2 | * | 5/2015 | Wilkins | B65G 47/46 |
| | | | | 198/370.02 |
| 2003/0079971 A1 | | 5/2003 | Veit et al. | |
| 2006/0060447 A1 | | 3/2006 | Ramaker et al. | |

\* cited by examiner

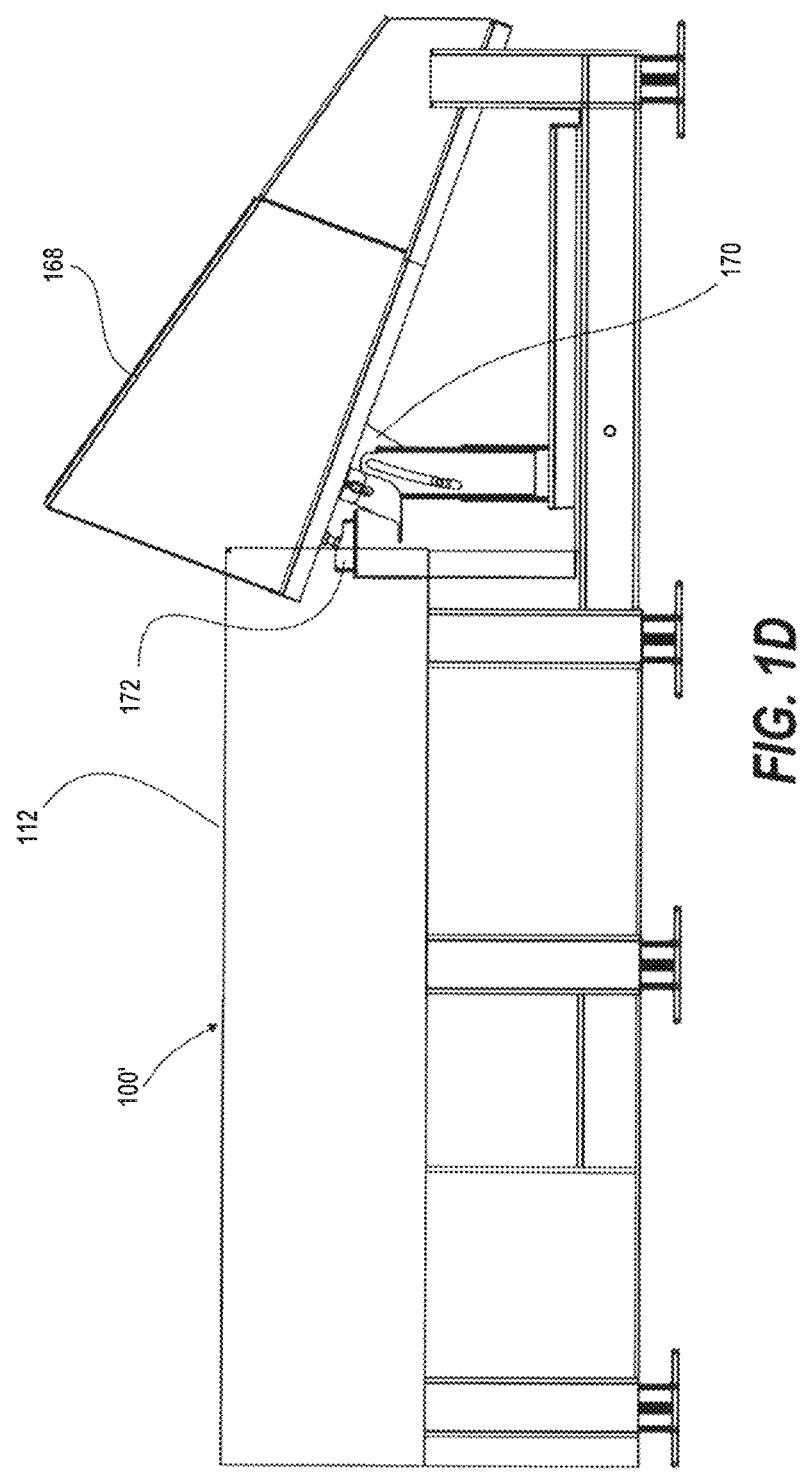

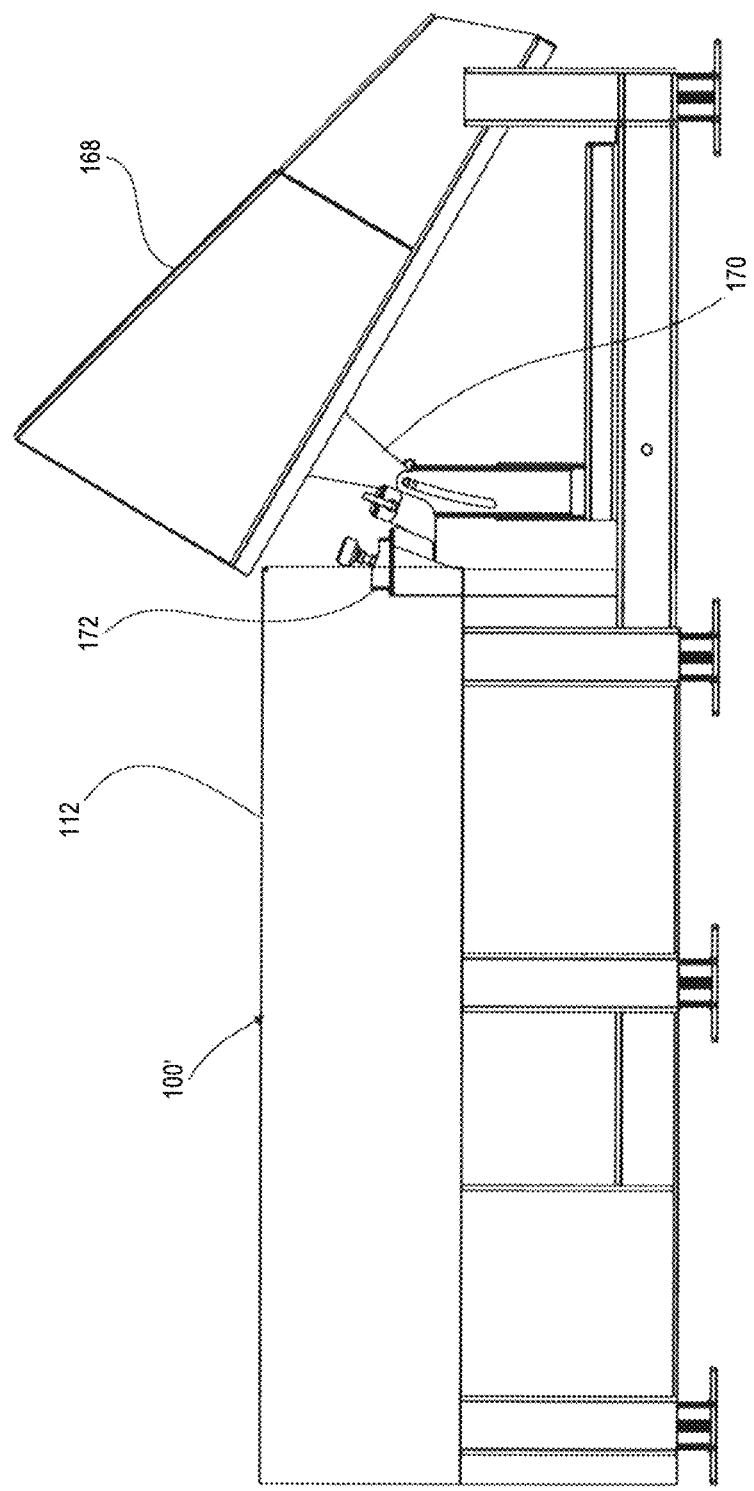

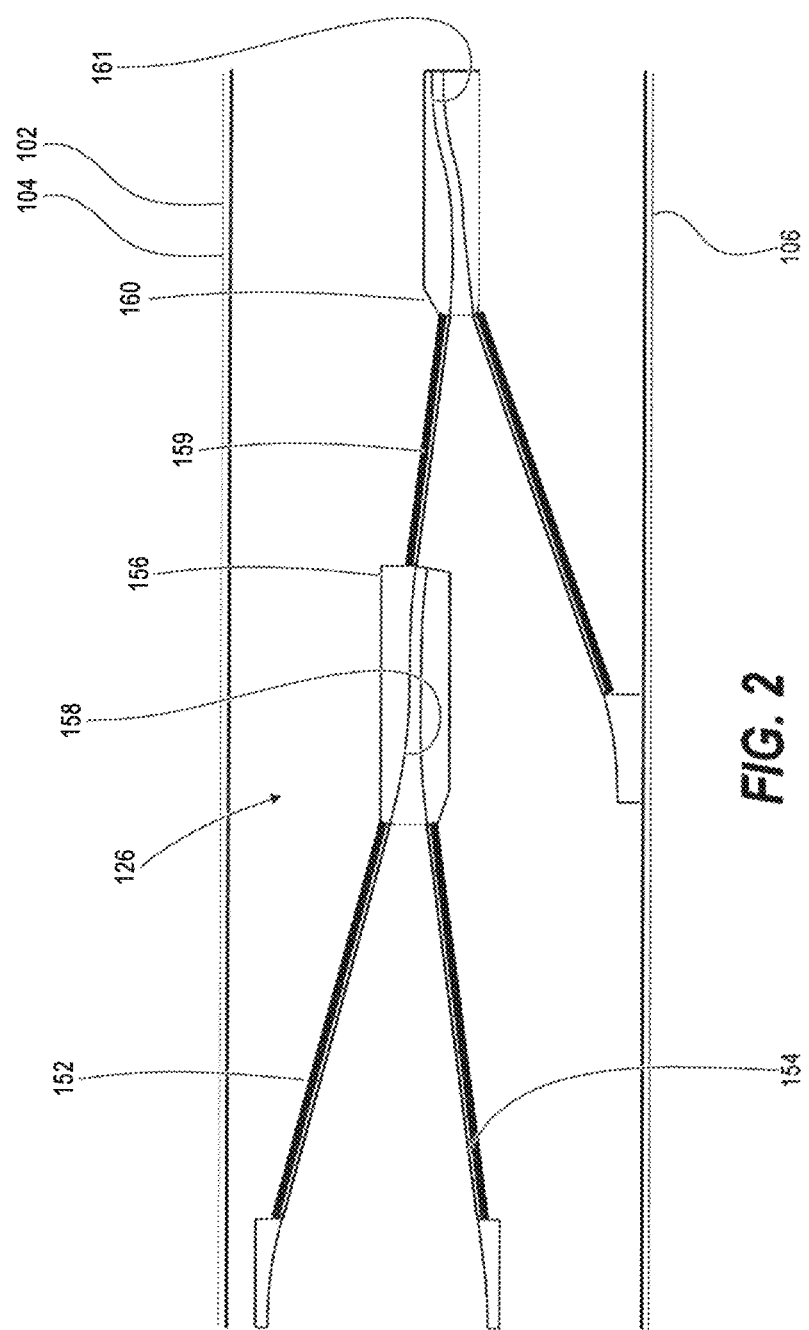

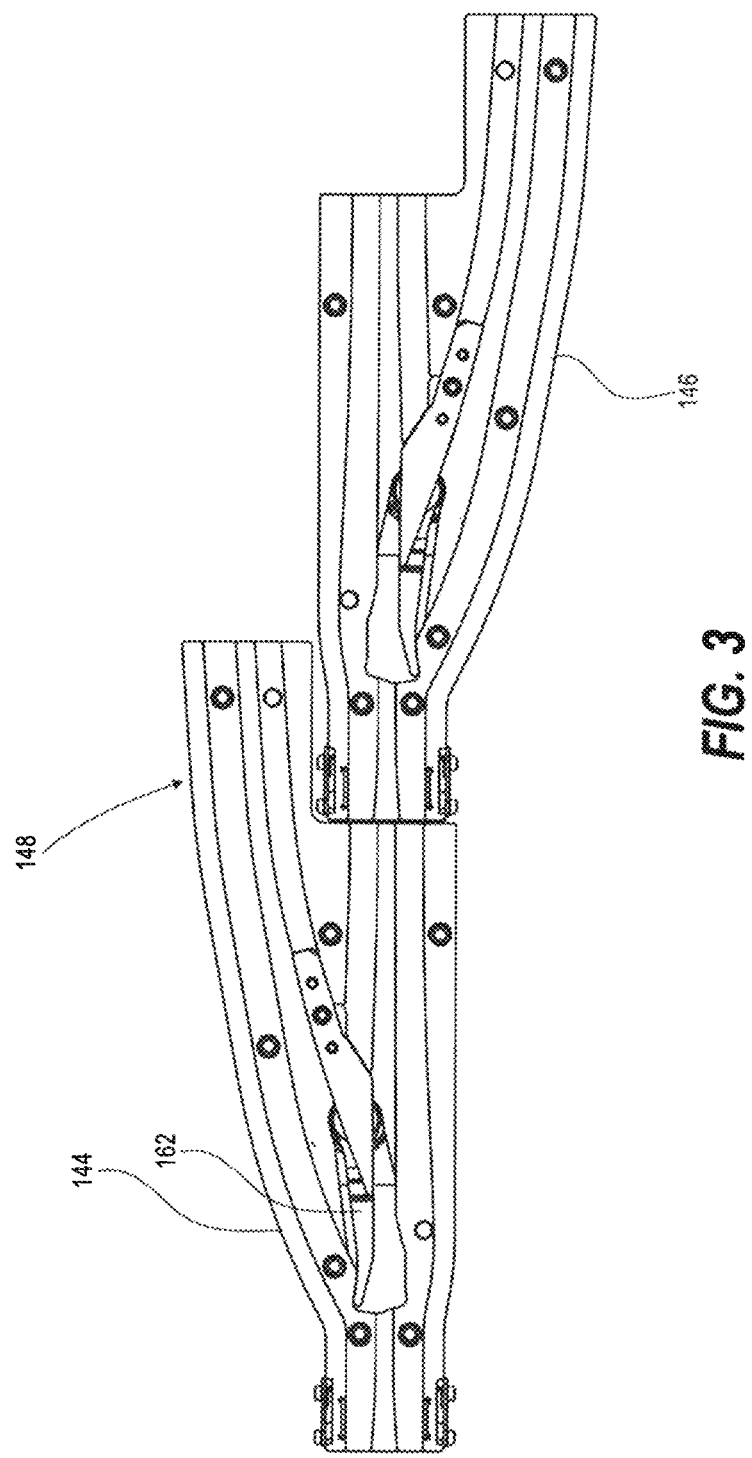

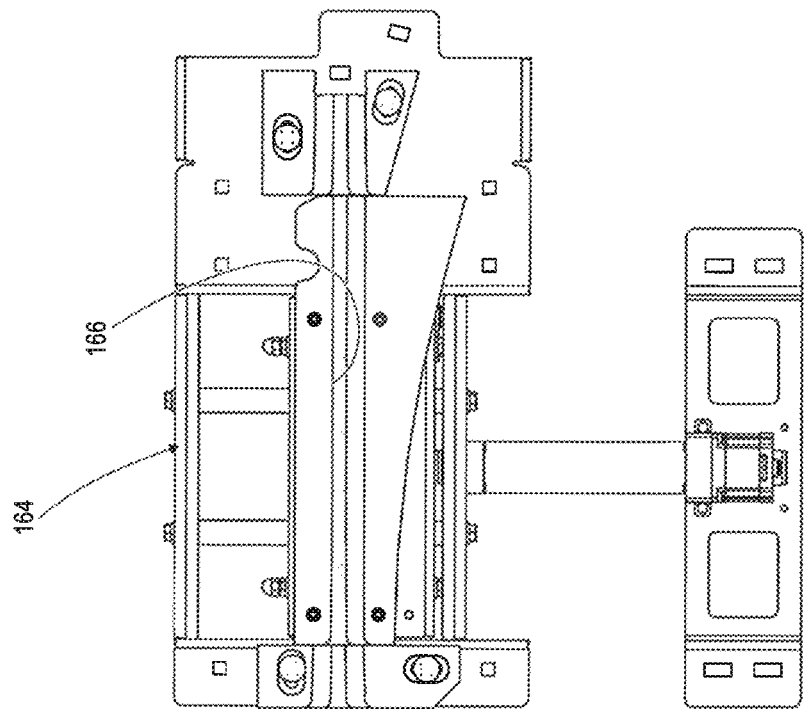
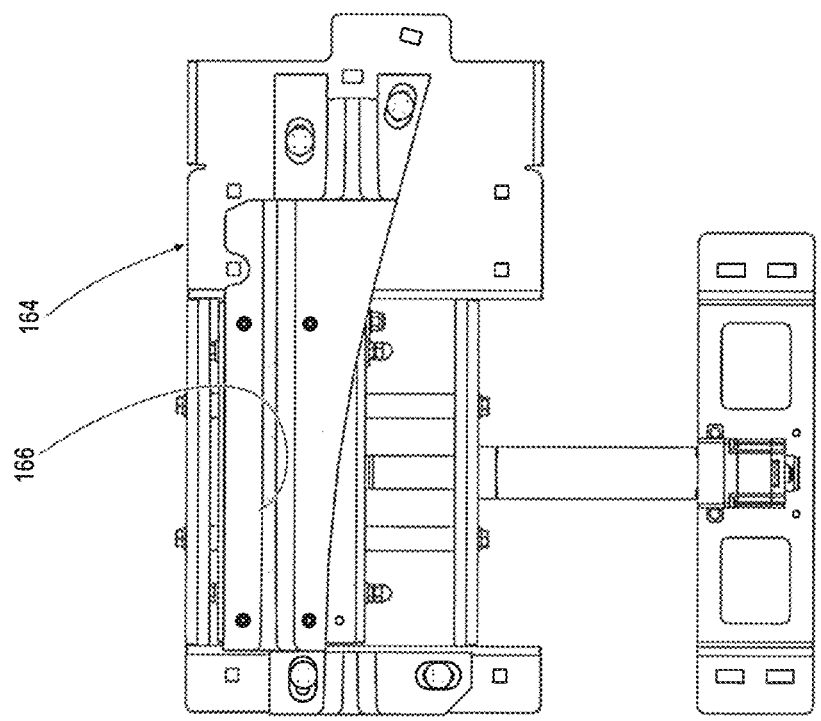

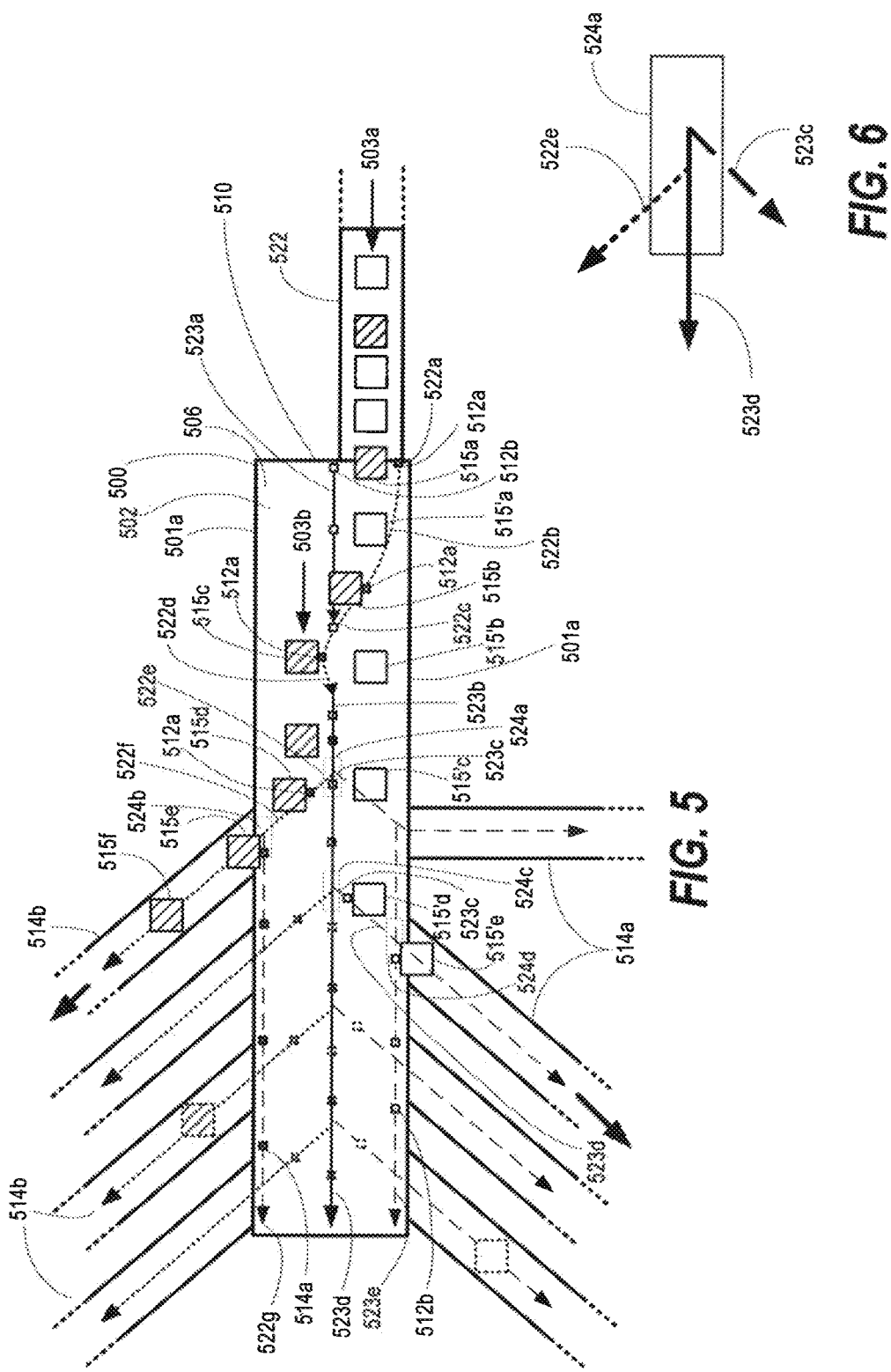

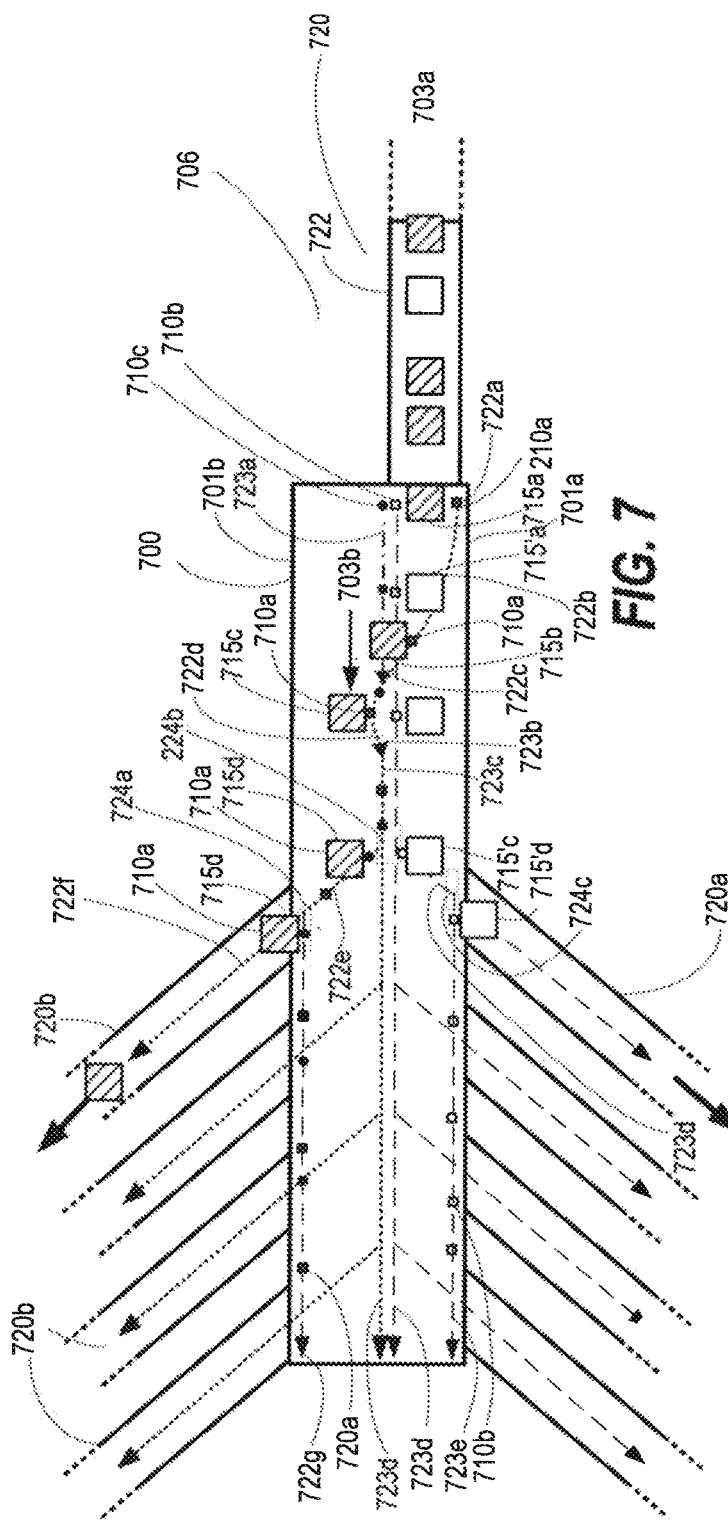
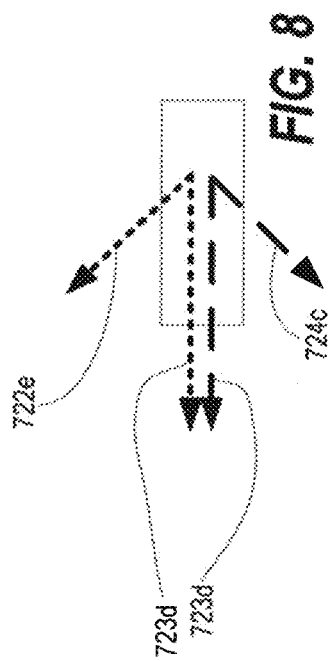
FIG. 7
FIG. 8

HIGH-SPEED, DUAL-SIDED SHOE SORTER WITH OFFSET INDUCT

CLAIM OF PRIORITY UNDER 35 U.S.C. §119

The present Application for patent claims priority to (i) U.S. Provisional Patent Application No. 62/157,501 filed on 6 May 2015 and entitled "Dual Sided Shoe Sorter with Offset Induction Lane"; and (ii) Provisional Patent Application No. 62/308,401 filed on 15 Mar. 2016 and entitled "High-Speed Linear Sortation Conveyor with Selective Top Reinduction"; both assigned to the assignee hereof, and both hereby expressly incorporated by reference in their entirety.

BACKGROUND

1. Technical Field

The present disclosure relates generally to linear sortation conveyors, also known as shoe sorters, and their components, and is particularly directed to dual sided shoe sorters.

2. Description of the Related Art

Sortation conveyors are essential components of high volume distribution and fulfillment operations. A sortation conveyor system typically conveys and distributes articles along moving conveyor surfaces, and diverts selected articles onto a particular conveying branch. Sortation conveyors often employ a plurality of pusher elements which may be selectively moved across the conveying surface in order to divert an article from the primary conveying path and onto a secondary conveying branch. Sortation conveyors have a primary conveying surface which can comprise an endless conveyor belt loop formed from plurality of transverse rollers or slats. When it is necessary to direct an article from the moving conveying path and onto a secondary conveying branch, a switch or switch mechanism is actuated to cause an assigned set of pusher elements to be diverted across the moving conveyor surface. The transversely diverted pusher elements engage the article to the secondary conveying branch, such as a takeaway conveyor. Sortation conveyors often use divert tracks or guide surfaces which direct the assigned set of pusher elements laterally across the conveying surface, while pusher elements which are not assigned pass by the divert tracks and continue to travel along the conveying surface in their set position.

Dual sided shoe sorters can provide a higher density sortation solution with each side of the sorter acting as a single sided shoe sorter that is fed from respective induction conveyors. However, such generally known dual sided shoe sorters such as described in U.S. Pat. No. 6,478,144, the disclosure of which is hereby incorporated by reference, require pre-sorting and separate conveyance of article to respective sides of the dual sided shoe sorter.

During the 1980s, UNISORT 5 sorter by Applicant's predecessor the Buschman Company, Cincinnati, Ohio, employed a single center induct that supplied a dual sided shoe sorter. The straight angled pre-sort switches and guides necessarily had to operate at about 300 fpm or less, a low speed by today's stands. This speed limitation was also imposed on the divert switches and guides that also were straight angled. Higher speed operation would cause great variability in the lateral placement during pre-sort of articles such as totes and cartons during pre-sort, depending on weight, friction, etc. High speeds during the divert tended to impact and tumble the articles.

Higher speed linear sortation conveyors can provide for greater throughput. U.S. Pat. No. 7,516,835 B2 ("Soft Touch Patent"), the disclosure of which is hereby incorporated in its entirety, provides a high speed sliding shoe sortation conveyor. A divert guide is configured to guide shoes or pushers to engage articles disposed on an endless conveying surface at an initial impact which does not result in an out of control situation even at high speeds. The divert guide path is disposed at a plurality of divert angles, and guide pushers to engage articles at a low initial contact divert angle and first lateral speed and to accelerate the articles to a final divert angle and second, higher, lateral speed. The pushers may be undergoing lateral acceleration at the time initial contact is made with the articles. Articles are inducted onto the endless conveyor surface close to the pushers so that the pushers initially contact a selected article at relatively low lateral speed and then smoothly accelerate the article to the divert location.

BRIEF DESCRIPTION OF THE FIGURES

FIG. 1D illustrate a front cross sectional view in elevation of an example linear sortation conveyor having a flip up divert chute lowered to a nominal position, according to one or more embodiments;

FIG. 1E illustrates a front cross sectional view in elevation of the example linear sortation conveyor of FIG. 1D having the flip up divert chute raised to a clearing position, according to one or more embodiments;

FIG. 2 illustrates a top detailed view of a pre-sort section of the pin guide assembly of FIG. 1C, according to one or more embodiments;

FIG. 3 illustrates a nested pair of left and right switches of a divert section of the pin guide assembly of FIG. 1C, according to one or more embodiments;

FIGS. 4A-4B illustrate top views respectively of an actuated and unactuated position of a calibration gate device of the pin guide assembly of FIG. 1C, according to one or more embodiments;

FIG. 5 illustrates a top schematic view of an alternate dual shoe sorter with offset induct and with two outside paths and one center path for pushers to follow, according to one or more embodiments;

FIG. 6 illustrates a top view of a path selector switch of FIG. 5 annotated with the selectably switchable paths available for a pusher to take, according to one or more embodiments;

FIG. 7 illustrates another alternate embodiment of a dual shoe sorter having an offset induct, and two outside paths and two central paths for the pushers to follow, according to one or more embodiments;

FIG. 8 illustrates a four path selector switch of FIG. 7 annotated with the four paths available for the two central paths;

DETAILED DESCRIPTION

Figure 1A:
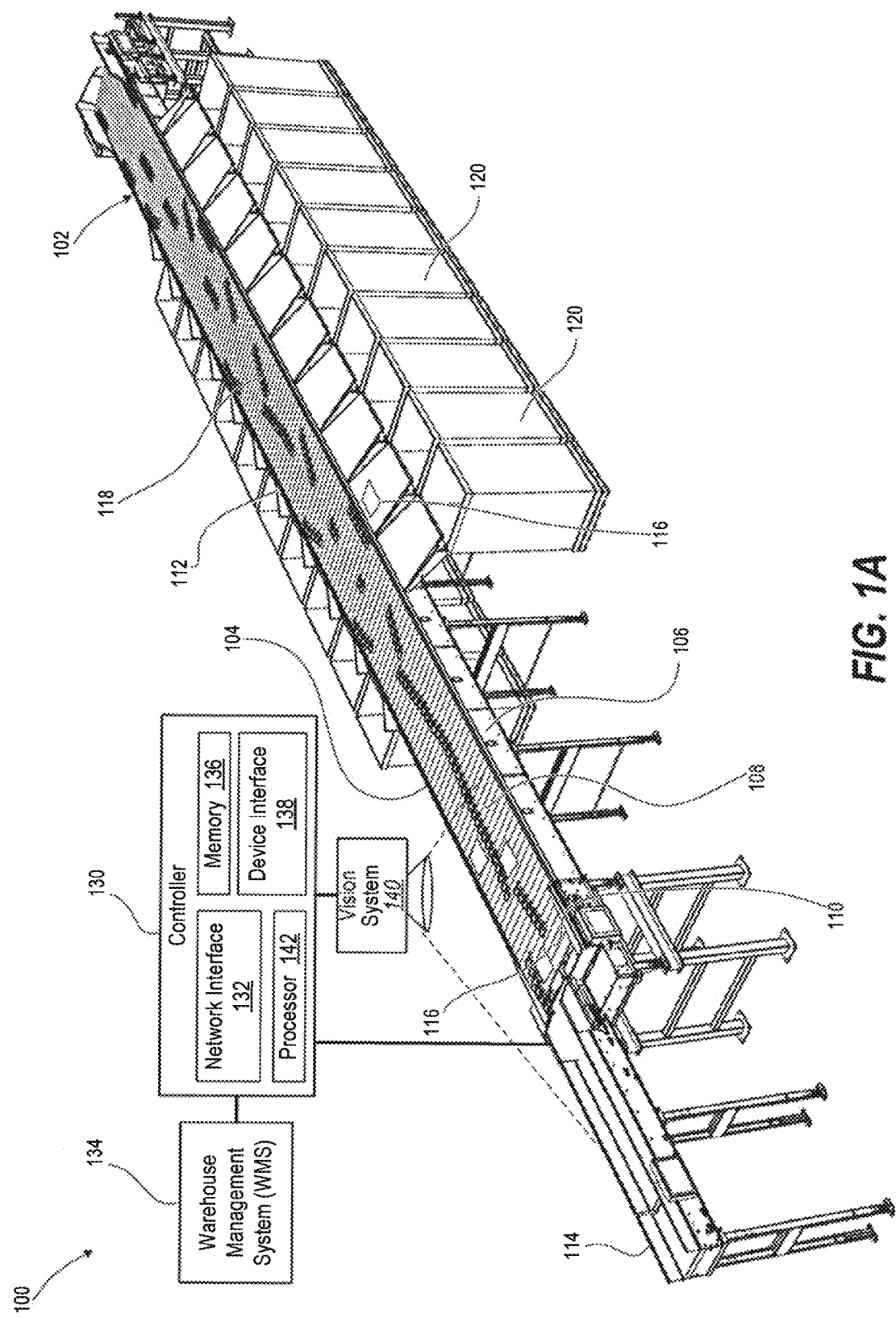
FIG. 1A illustrates an isometric view of a dual-sided, linear sortation conveyor with offset induct, according to one or more embodiments.

The present innovation provides for a sortation conveyor including an elongate frame having a pair of lateral side frames. An endless apron is supported for longitudinal movement on the elongate frame to define a top conveying run and a bottom return run. An induction conveyor is positioned to deposit articles on an offset lateral portion of the top conveying run. More than one pusher is received for lateral movement across the endless apron transverse to the longitudinal movement. Each pusher has a pin extending below the top conveying run. More than one divert target is positioned respectively along each lateral side of the elongate frame to receive articles diverted by one or more pusher from the distally-moving top conveying run of the apron. A pin guide assembly is coupled between the elongate frames. The pin guide assembly is upwardly presented to selectively receive the pin of respective more than one pusher. The pin guide assembly includes an upstream pre-sort section that positions the articles from the offset lateral portion to an opposite lateral portion of the top conveying run. The pin guide assembly includes a downstream divert section that selectively diverts the articles left or right to the assigned divert target.

In one aspect, the present disclosure provides a method of dual sided sortation of articles on a linear sortation conveyor. In one or more embodiments, the method includes receiving a scanned identification of a train of articles on an induction conveyor positioned to sequentially deposit each one of the train of articles on an offset lateral portion of a top conveying run of a sortation conveyor. The sortation conveyor includes (i) an elongate frame comprising a pair of lateral side frames; (ii) an endless apron supported for longitudinal movement on the elongate frame to define a top conveying run and a bottom return run; (iii) more than one pusher received for lateral movement across the endless apron transverse to the longitudinal movement, each pusher having a pin extending below the top conveying run; (iv) more than one divert target positioned respectively along each lateral side of the elongate frame to receive articles diverted by one or more pusher from the distally-moving top conveying run of the apron; and (v) a pin guide assembly coupled between the elongate frames, and having an upstream pre-sort section and a downstream divert section that are upwardly presented to selectively receive the pin of respective more than one pusher. The method includes receiving a divert target for each of the train of articles. The method includes assigning one or more pushers predicted to flank a selected article of the train of articles to one of an outer position and a central position that each flank the offset lateral portion of the top conveying run that receives inducted articles. The assigned pushers are on an opposite side of the flanked article as the assigned divert target. The method includes resetting each pusher to the assigned one of outer position and the central position prior to induction of the corresponding article, wherein the pre-sort section guides pushers in the outer position to the central position while moving the flanked article to an opposite lateral portion of the top conveying run. The method includes selectively switching assigned pushers left or right in the divert section at a divert switch that corresponds to the assigned divert target.

In another aspect, the present disclosure provides a controller of a dual sided sortation of articles on a linear sortation conveyor. In one or more embodiments, the controller includes a network interface that communicates with a warehouse management system. The controller includes a memory containing parameters identifying divert targets of a dual-sided sortation conveyor. The controller includes a device interface in electrical communication with the dual-sided sortation conveyor and an article scanner that identifies the articles. A processor subsystem is in communication with the network interface, the memory, and the device interface. In one or more embodiments, the processor subsystem receives a scanned identification of a train of articles on an induction conveyor positioned to sequentially deposit each one of the train of articles on an offset lateral portion of a top conveying run of the sortation conveyor. The processor subsystem receives identification of a divert target for each of the train of articles, the processor subsystem assigns one or more pushers predicted to flank a selected article of the train of articles to one of an outer position and a central position that each flank the offset lateral portion of the top conveying run that receives inducted articles. The assigned pushers are on opposite sides respectively of the flanked article as to the assigned divert target. The processor subsystem resets each pusher to the assigned one of outer position and the central position prior to induction of the corresponding article. The pre-sort section guides pushers in the outer position to the central position while moving the flanked article to an opposite lateral portion of the top conveying run. The processor subsystem selectively switches assigned pushers left or right in the divert section at a divert switch that corresponds to the assigned divert target.

In an exemplary embodiment, the dual-side, linear sortation conveyor ("sorter") starts at an infeed belt that brings product onto the sorter conveying surface (flights). This infeed belt utilizes a four-pulley hitch and modular light grid by SICK AG, Waldkirch, Germany, to detect thin (envelopes) and non-uniform items (polybags). The product is carried by the belt to the sorter flights at the pre-sort section of the sorter. Similar to a dual-sided shoe sorter, a setup switch pre-positions the shoes to be opposite the product's intended divert side. The pre-sort section then positions the product on the correct half of the sorter and also sets the product alignment to fully receive the benefits of the aforementioned Soft Touch technology divert disclosed in the Soft Touch Patent. After the pre-sort section, product travels down the length of the sorter on the side of its destination. When the product reaches its destination, the product goes through the Soft Touch divert path and is diverted on a fixed angle while being guided off the sorter. In many applications, embodiments consistent with the present innovation can use chutes that have a wall (cricket) perpendicular to the sorter. The chutes direct the product to gay lords, bins, or other powered conveyor. At the drive/discharge end of the sorter, undiverted product leaves the flights by entering a chute. This chute facilitates merging the two streams of product back to one and has the ability to flip up out of the way to minimize damage to the machine.

Internally, the sorter has some differences from generally-known shoe sorters. The first is a calibration gate that interrupts the one side of the standard pre-sort path to allow a pattern set by the set-up switch to be read at the photoeyes of the product diverting switches. The calibration gate opens a secondary path, used only for calibration, where shoes are not returned to the center of the sorter, but continue travelling as if diverted. Another difference is the relationship of successive divert switches to each other. These new switches feature a puzzle-piece design that allows the sortation conveyor to reach tighter divert centers than generally-known standard sorters.

In an exemplary embodiment, gentle product align and pre-sort are provided. The arrangement of the internal components on slight angles gently aligns the product on its correct divert side with the necessary pushers in the center of the sorter. These gentle angles are 15 degrees at the greatest, 7.5 and 7.6 degrees at the other two locations. There are many arcs that the guiding pushers travel through that have large radii for the smoothest transitions possible (84 in, 72 in, 80 in, 60 in, and 42 in). The large radius arcs and shallow angles have been tested and shown to have greater product control and allow the system to run at higher speeds than a previous design based on 30 degree angles. The higher operating speed allows the system to have higher throughput.

In the following description, like reference characters designate like or corresponding parts throughout the several views. Also, in the following description, it is to be understood that terms such as front, back, inside, outside, and the like are words of convenience and are not to be construed as limiting terms. Terminology used in this patent is not meant to be limiting insofar as devices described herein, or portions thereof, may be attached or utilized in other orientations It should be appreciated that any patent, publication, or other disclosure material, in whole or in part, that is said to be incorporated by reference herein is incorporated herein only to the extent that the incorporated material does not conflict with existing definitions, statements, or other disclosure material set forth in this disclosure. As such, and to the extent necessary, the disclosure as explicitly set forth herein supersedes any conflicting material incorporated herein by reference. Any material, or portion thereof, that is said to be incorporated by reference herein, but which conflicts with existing definitions, statements, or other disclosure material set forth herein will only be incorporated to the extent that no conflict arises between that incorporated material and the existing disclosure material.

Figure 1B:
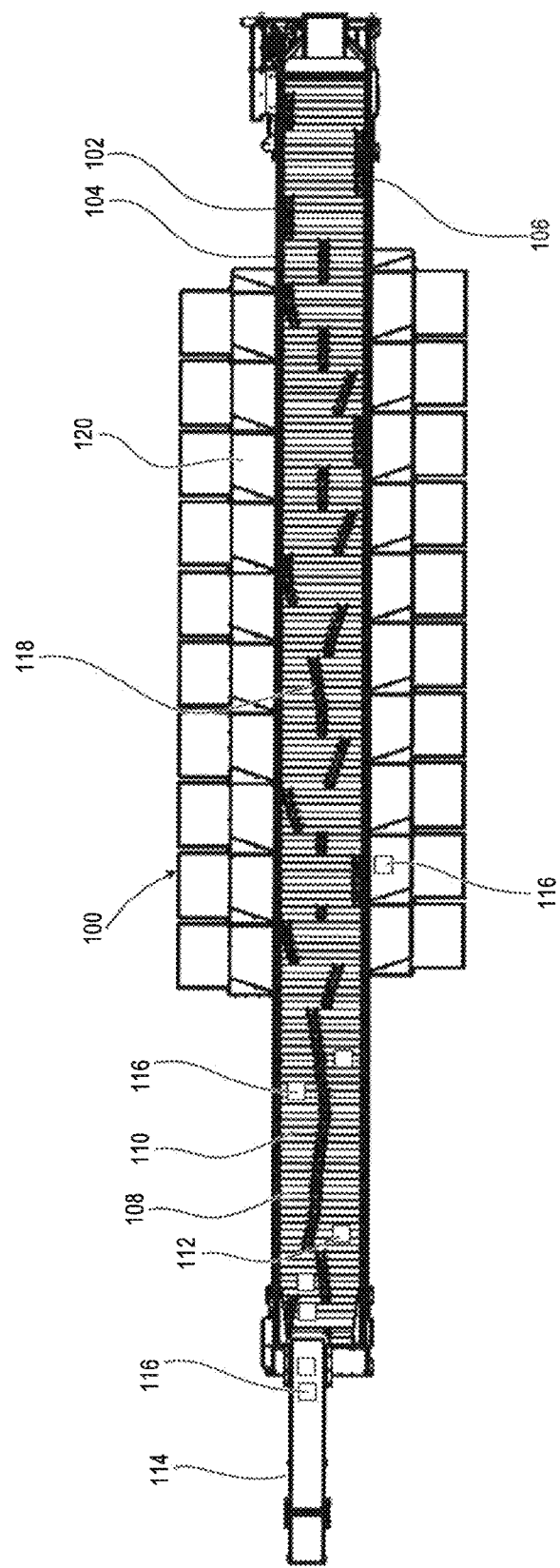
FIG. 1B illustrates a top view of the dual-sided, linear sortation conveyor with offset induct of FIG. 1A, according to one or more embodiments.
Figure 1C:
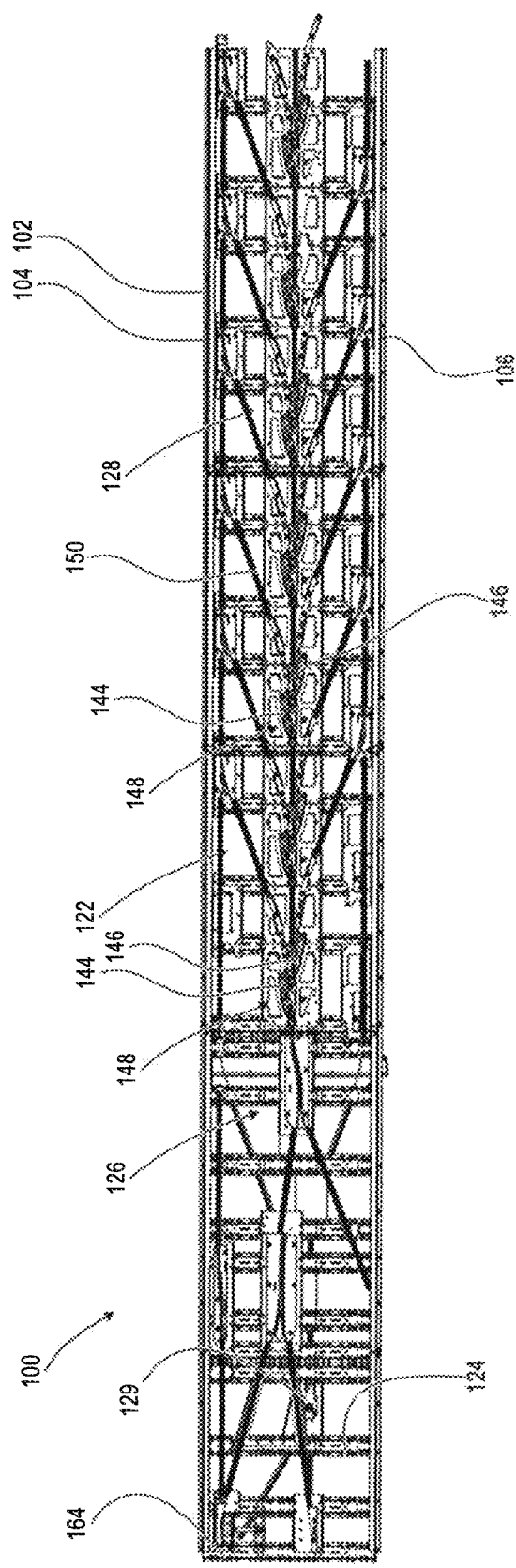
FIG. 1C illustrates a top view of the elongate frame and pin guide assembly of the dual-sided, linear sortation conveyor with offset induct of FIG. 1A, according to one or more embodiments.

FIGS. 1A-1C illustrate an exemplary sortation conveyor 100 that includes an elongate frame 102 having a pair of left and right lateral side frames 104, 106. An endless apron 108 of lateral slats 110 is supported for longitudinal movement on the elongate frame 102 to define a top conveying run 112 and a bottom return run (not shown). An induction conveyor 114 is positioned to deposit articles 116 (FIGS. 1A-1B) on an offset lateral portion of the top conveying run 112, which in the illustrative example is to the left. In an exemplary embodiment, the induction conveyor 114 is offset induct belt that allows use of a single pusher on each flight that runs down the center of the sortation conveyor 100 and that allows divert of article (product) 116 off both sides of the sortation conveyor 100. This offset is established in such a way that the oncoming product is automatically aligned to take full advantage of the Soft Touch technology divert path. When the upstream conveyor is properly aligned, the offset induct ensures that every product that comes onto the sortation conveyor 100 is properly adjusted for maximum product control during a Soft Touch divert.

More than one pusher (or shoe) 118 is received for lateral movement across the endless apron 108 transverse to the longitudinal movement. Each pusher 118 has a pin (not shown) extending below the top conveying run 112. More than one divert target 120 is positioned respectively along each lateral side of the elongate frame 102 to receive articles 116 diverted by one or more pushers 118 from the distally-moving top conveying run 112 of the endless apron 108. The divert target 120 can be a gaylord container separated from an adjacent gaylord container by a cricket divider. Alternatively, the divert target 120 can be a chute or a divert conveyor.

FIG. 1C illustrates a pin guide assembly 122 that is coupled between the left and right lateral side frames 104, 106 of the elongate frame 102 by cross frame members 124. The pin guide assembly 122 is upwardly presented to selectively receive the pin of respective more than one pusher 118 (FIGS. 1A-1B). The pin guide assembly 122 includes an upstream pre-sort section 126 that positions the articles 116 (FIGS. 1A-1B) from the offset lateral portion to an opposite lateral portion of the top conveying run 112. The pin guide assembly 122 includes a downstream divert section 128 that selectively diverts the articles 116 (FIGS. 1A-1B) left (offset lateral portion) or right (opposite lateral portion) to the assigned divert target 120. A setup switch 129 attached below cross frame members 124 interacts with pins on the bottom return run (not shown) to selectively switched to pre-position the pushers 118.

Returning to FIG. 1A, a controller 130 of the linear sortation conveyor 100 can include a network interface 132 that communicates with a warehouse management system (WMS) 134. The controller 130 can include a memory 136 containing parameters identifying the divert targets 120 and other configuration settings. The controller 130 can include a device interface 138 that is in controlling electrical communication with the dual-sided sortation conveyor 100 and an article scanner or vision system 140. A processor subsystem 142 of the controller 130 is in communication with the network interface 132, the memory 136, and the device interface 138. The processor subsystem 142 (i) receives a scanned identification from the article scanner or vision system 140 of a train of articles 116 on the induction conveyor 114 positioned to sequentially deposit each one of the train of articles on an offset lateral portion of a top conveying run of the sortation conveyor. The processor subsystem 142 (ii) receives identification of a divert target from WMS 134 for each of the train of articles 116. The processor subsystem 142 (iii) assigns one or more pushers 118 predicted to flank a selected article 116 of the train of articles 116 to one of an outer position and a central position. The assigned position each flank the offset lateral portion of the top conveying run 112 that receives inducted articles 116. The respective assigned positions are on an opposite side of the flanked article 116 as to the assigned divert target 120. The processor subsystem 142 (iv) selectively resets each pusher 118 to the assigned one of outer position and the central position prior to induction of the corresponding article. Subsequently, the pre-sort section 126 guides pushers 118 that are in the outer position to the central position while simultaneously moving the flanked article 116 to an opposite lateral portion, in this instance the right side, of the top conveying run 112. The processor subsystem 142 (v) selectively switches either left switch 144 or right switch 146 of a reduced longitudinal footprint nested switch pair 148 (FIG. 1C) that correspond to an assigned divert target 120. Switch nesting allows for tighter divert spacing while maintaining product control through the divert section 128. This is a specific application of Soft Touch technology, where the nesting offers a specific benefit of facilitating Soft Touch technology on these tight divert centers. The straight-through path of each switch has been cut short to allow the divert path and the entrance to the next switch to overlap. This overlap facilitates tight divert centers with independent switches that would be unachievable with traditional switch designs and divert paths.

The assigned pushers 118 follows the activated left or right switch into an arcuate divert guide 150 in the divert section 128 to divert the flanked article 116 at the assigned divert target 120. Each respective divert guide 150 provides a path including an arcuate portion having an entrance at a first angle that smoothly increases to a larger second angle to the longitudinal movement, the arcuate portion laterally accelerating the selected, flanked articles without any abrupt impacts.

The vision system 140 allows reassignment of pushers 128 after pre-sorting. Generally-known dual-sided sorters have to assign pushers to product before the product is inducted onto the sorter and cannot readjust which pushers are assigned. In the present innovation, because all of the pushers 118 return to the center of this sortation conveyor 100 between pre-sorting and diverting, the controller 130, using the vision system, the control system 140, can reassign pushers 118 based on the position of a selected article 116 to the pushers 118 after the article 116 has been pre-positioned for a left or right divert. Thereby, the controller 130 can correct for articles 116 that shifts during the pre-sorting.

FIGS. 1C and 2 illustrates the pre-sort section 126 as having left and center guides 152, 154 that converge on a first center trough member 156 whose output feeds into a center guide 158 that is slightly slanted to the right along with a right guide 159 that angles to the center to feed into a second center trough member 160 having a slight leftward arcuate path 161. The second center trough member 160 is shaped to gently complete an arcuate lateral pushing of selected articles that should be moved from the left to the right. Articles that are presorted are positioned proximate to a pusher 118 (FIGS. 1A-1B) for high speed diverting.

FIGS. 1C and 3 illustrate the left switch 144 and right switch 146 of the reduced longitudinal footprint nested switch pair 148 as each having an actuated member 162 that in one position allows a pin to move distally and in another position diverts the pin into the divert path. Although a pass through path from the upstream left switch 144 serially transfers a pin into the downstream right switch 146 of the nested switch pair 148, a laterally overlapping portion of each switch 144, 146 achieves a reduced longitudinal footprint and thus allows more divert targets while still providing sufficient length for smoothly curving guides.

FIGS. 1C and 4A-4B illustrate a calibration gate device 164 of the pin guide assembly 122 that is generally in an unactuated position (FIG. 4B) that does not laterally deflect a pin. FIG. 4A illustrates the calibration gate device 164 in an actuated position. A pin that currently receives in its guide slot 166 is deflected outward outside of possible engagement by other portions of the pin guide assembly 122. A pusher 118 (FIGS. 1A-1B) thus deflected will proceed unimpeded outside of the position of other pushers 118 allowing for an opportunity to calibrate the sortation conveyor 100. Thus in an exemplary embodiment, a gentle product alignment path provided by the sortation conveyor 100 has the ability to be interrupted by the calibration gate 164. The calibration gate device 164 moves a piece of machined plastic that provides two separate paths for pushers to travel in. The standard position directs the pusher 118 (FIG. 1A) through an arc to minimize disturbance to the product. The calibrate position allows the pushers 118 to go straight through and appear as diverted pushers even though no product divert switches have diverted them. These pushers diverted by the calibration gate device 164 will traverse the length of the top conveying surface 112 and be returned by the setup switch 129. In the exemplary embodiment, the calibration gate device 164 can employ a linear actuator, but pneumatic and DeStaCo clamp options are contemplated and are viable.

In an exemplary embodiment, FIGS. 1D-1E illustrates a sortation conveyor 100' having flip up drive discharge chute 168 that is hinged to lift out of the way of obstructions, (i.e., flight out of position, other jam conditions). The discharge chute 168 protects other sorter components from seeing excessive damage by readily yielding due to an impact, such as from a flight that out of position or articles jamming on the top conveying run 112. In the exemplary embodiment, the discharge chute 168 is pitched downward at 20°, but designs of 30-14° are acceptable. Less than 14° and articles ("product") stalls regularly on the discharge chute 168. Generally, 30° is a limitation of a design geometry of the drive as currently existing. The discharge chute 168 has aluminum pins 170 that are necked down to prevent the discharge chute 168 from swinging too high. The aluminum pins 170 will shear to prevent significant damage elsewhere. The first sliding surface the product currently sees as the product leaves the sortation conveyor 100 is a wood piece, similar to what is used on tilt-tray chutes. This wood piece stays flat and is not subject to warping issues that can plague similar pieces made out of welded steel. The wood piece 172 that product exits onto is also grooved to serve as a break-away if significant downward force is applied. The discharge chute features compound angles in the direction of travel to combine the two streams of product from the sorter to a single flow and exit point.

FIG. 5 illustrates an example double wide or dual sided or dual lane sortation conveyor 500 having a conveying surface 505 on an endless belt or apron 506. The innovation disclosed and claimed herein, in one aspect thereof, comprises a dual lane sortation conveyor 500 that receives articles 516 from an induction lane, such as conveyor 522 in line with one of the dual lanes 523, 525, sorts the articles 516 into two the lanes 523, 525, and then diverts articles 516 onto any of a plurality of side paths provided by left and right divert conveyors 516 connecting to either side of the dual lane sortation conveyor 500. In one or more embodiments, conveyor 522 can be a reinduction conveyor from above. Although a conveyor 522 can be single lane, the dual lane sortation conveyor 500 can divert to either lateral side. The conveying surface 505 conveys two parallel rows or lanes 503 of articles 516 being conveyed side by side between first side 501*a* and second side 501*b*. Endless apron 506 comprises parallel slats moving endlessly from upstream to downstream between first side 501*a* and second side 501*b* with a sliding pusher shoe or pusher 512 slidingly secured within each gap between slats (not shown). Pushers 512 move laterally at 90 degrees to the upstream-to-downstream movement of the conveying surface 505 to eject articles 516 from either side of the sortation conveyor 500, and onto a selected divert 514. A plurality of diverts 514 can comprise any of conveyors, chutes, guides and the like, and can extend from either of first side 501*a* and second side 501*b* of the sortation conveyor 500. As depicted, first diverts 514*a* extend from first side 501*a*, and second diverts 514*b* extend from second side 501b and diverts can be at any angle of up to 90 degrees relative to the sortation conveyor. In this view, as conveyor 522 is ejecting articles 516, 516 into first lane 503a on the induct side of the sortation conveyor 500. As shown, conveyor 522 is in line with first lane 503a on the induct side of the sortation conveyor 500 and ejects all articles 516 into first lane 503 from conveyor 522.

Pushers 512 are pre-positioned on the endless belt or apron 506 on the underside of the dual lane sortation conveyor 500 by one or more setup or pre-positioning switches 580 shown in FIG. 5. The pre-positioned pushers 512 emerge from the underside as two parallel rows of pushers 512 flanking a first lane 503a of conveyor 522. Induct pushers 512a emerge biased towards the first side 501a of sortation conveyor 500, and central pushers 512b are biased centrally on the parallel slats. For clarity of directional movement, induct pushers 512a have gray colored centers and central pushers have white centers. Likewise, articles 516 pushed or biased by induct pushers 516a are hatched, and articles 516' pushed or biased by central pushers 512b are white. All induct pushers 512a bias or divert articles 516 onto second diverts 514b, and central pushers 512b bias or divert articles 516' onto first diverts 514a.

This first embodiment is for a three (3) path sortation conveyor 500 having three paths for pushers 512a, 512b to follow. Two paths are outboard, path 522g and path 523e, and one is in the middle or center path 523e. For this embodiment, all articles 516 are received on first path 503a. To show the downstream movement of article 516 and pusher 512a, a series of snapshots (516a-516f) are shown as article 516 moves from the first lane 503 and, in a two-step process, onto second divert 514b. Article 516 is shown entering onto the moving sortation conveyor 500 at position 522a. In the first step, induct pusher 512a is carried on moving conveying surface 510 and contacts and follows an arcuate rail underneath moving slats (not shown). The contact with the arcuate rail moves article 516 laterally along arcuate path 522b to article location 516b. Article 516 is then moved laterally by pusher 512a along central arcuate path 522c to article location 516c which is in second lane 503b. From there, pusher 512a moves along arcuate path 522d towards the first side 501a to a central arcuate path 522c and moves downstream along straight central path 523b to switch 524a. For the second step, switch 524a diverts lateral pusher 512a from the central path onto path 522e. From there, pusher 512a moves along path 522e, article 516 is re-contacted, and moves to article location 516d. Article 516 then moves onto divert 514b and article position 516f while pusher 512a is guided downstream on path 522g by switch 524b.

Central pushers 512b move articles 516' onto first diverts 514a as follows. First, central pushers 512b move along path 523 to merge with the previously described central arcuate path 522c. From there, central pushers 512b follow arcuate path 522d and move onto straight path 523b. Switch 524 is positioned at the intersection of each pair of paths going to first diverts 514a and second diverts 514b and can selectively steer pusher 512a or pusher 512b onto any one of paths 522e, 523c and 523d (see FIGS. 5 and 6). For example, path 522e of switch 524a can divert either of pusher 512a or 512b into contact with article 516 and onto divert 514b. Path 523c can divert either of pusher 512a or 512b towards first side 501b, into contact with article 516', and onto first divert 514a. Path 523d is a straight line pass through that prevents either of pusher 512a or 512b from contacting with an article 516, or article 516'.

FIG. 6 shows an example of three direction switch 524a used in FIG. 5 to divert articles 516 onto any of paths 523c, 522e, or 523d. FIG. 7 shows an alternate embodiment of dual lane sortation conveyor 700 having a conveying surface 702 on an endless belt or apron 706. Dual lane sortation conveyor 700 of the second embodiment has two central parallel paths 723d and 323d extending downstream for pushers 702, and two outer paths 722g and 723e parallel and adjacent to respective first side 701a and second side 701b.

Article 516 is shown entering onto the moving sortation conveyor 700 at position 722a. In the first step, induct pusher 710a is carried on moving conveying surface 703 and contacts and follows an arcuate rail underneath moving slats 708 (not shown). The contact with the arcuate rail moves article 516 laterally along arcuate path 722b to article location 516b. Arcuate path 722b crosses over path 323d with a crossover. Article 516 is then moved laterally by pusher 710a along arcuate path 722c to article location 516c which is in second lane 703b. From there, pusher 710a moves along arcuate path 722d towards the first side 701a to a central position 722c and moves downstream along straight path 723b to switch 724b. For path 723, switch 724b offers two selections, divert lateral pusher 710a from the central path onto path 722e, or continue along path 723 (see FIG. 8). From there, pusher 512a moves along path 522e, article 516 is re-contacted, and moves to article location 516d. Article 516 then moves onto divert 720b and article position 516f while pusher 710a is guided downstream on path 722g by switch 724b.

Figure 9:
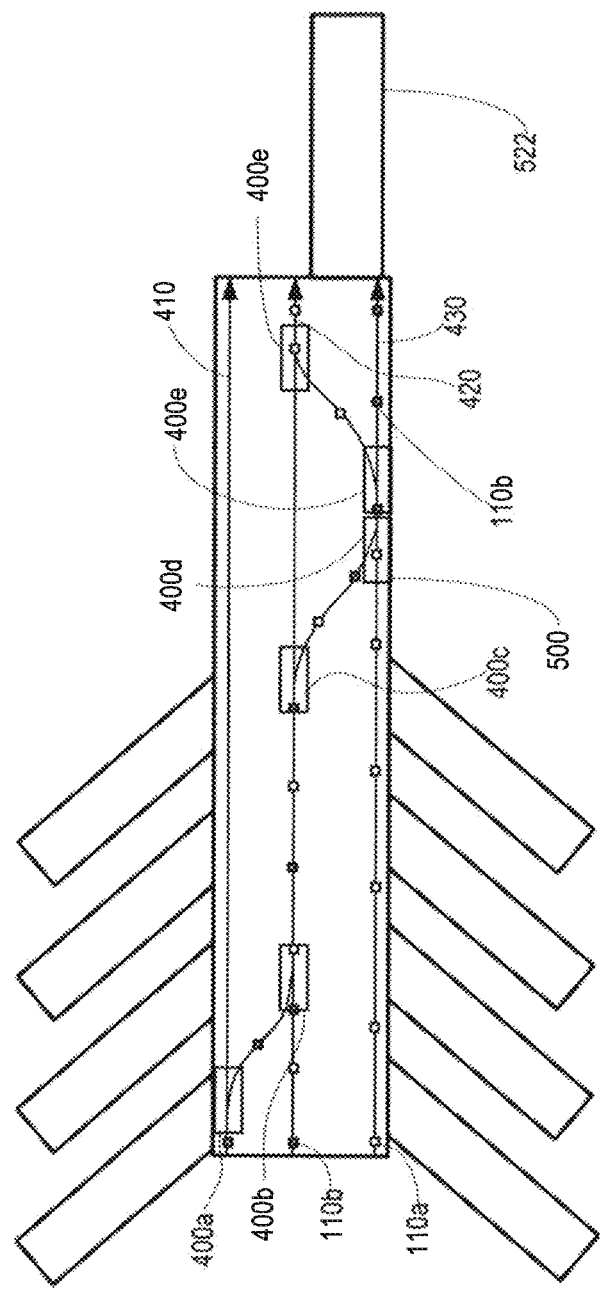
FIG. 9 illustrates an underside view of the sortation conveyor of FIG. 5 having pushers pre-positioned on the underside of the dual lane sortation conveyor by one or more setup or pre-positioning switches, according to one or more embodiments.
Figure 10:
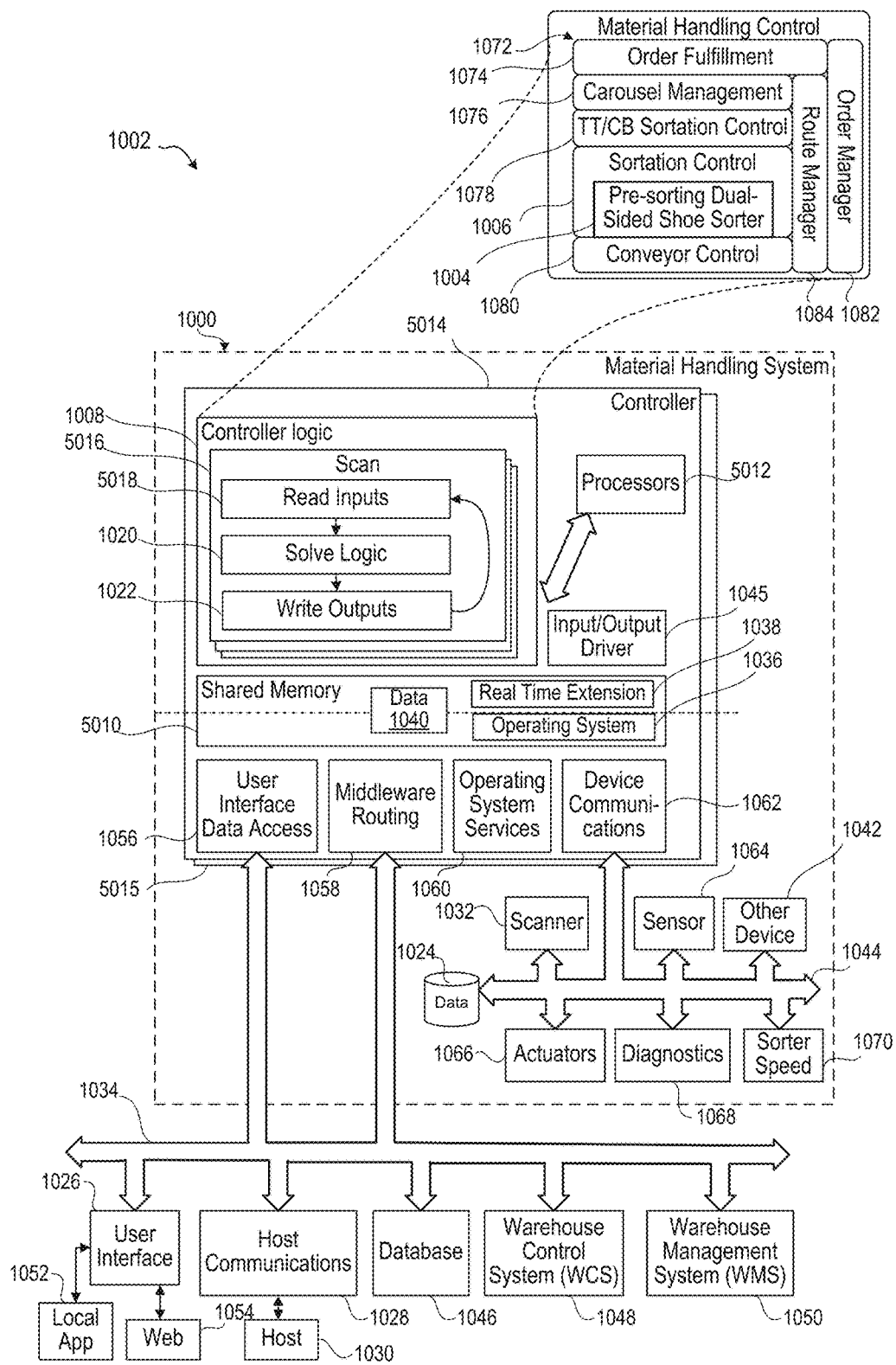
FIG. 10 illustrates a block diagram of an exemplary computing environment for executing the method of dual sided sortation from an offset induct, according to one or more embodiments.

FIG. 8 shows an example of the quad direction switch 724b used in FIG. 7 to divert articles 716 onto any of paths 723c, 722e, or 723d. FIG. 9 illustrates an underside view of the sortation conveyor 500 of FIG. 5 showing pushers pre-positioned on the underside of the dual lane sortation conveyor by one or more setup or pre-positioning switches In FIG. 10, an exemplary material handling system 1000 of a distribution center processing architecture 1002 is depicted wherein pre-sorting dual sided sortation controller 1004 is implemented within a sortation control 1006. Controller logic 1008 stored in computer-readable, shared memory 1010 is executed by processors 1012 in a controller 1014 of the material handling system 1000. One function of the controller logic 1008 can be machine control logic. The controller 1014 can be a primary controller supported by a backup controller 1015 such that maintenance personal could swap cables or connections in the event of a failure without undue service downtime. Alternatively, a supervising system or the self-diagnostics could cause automatic switching between primary and backup in the event of a failure.

Scan logic, or merely a scan 1016, refers to an implementation within the controller logic 1008 wherein the processors 1012 repeatedly execute a read input component 1018, a solve logic component 1020, and a write outputs component 1022. By performing this sequence on a regular, periodic basis (deterministic), then the machine control logic can count scans to measure time. These three steps can be performed by a programmable logic controller (PLC), a personal computer (PC), a minicontroller, or microcontroller, etc. The solve logic component 1020 can incorporate IF-THEN-ELSE branching logic, motion control, simple to sophisticates, hardlined to configured. Data, used by the solve logic component 1020, can reside in the computer-readable, shared memory 1010 or a data store device 1024 (e.g., local, remote, cloud-based, etc.). A user interface 1026 can be used to modify the solve logic component 1020 such as by changing values that change the configuration or operation.

As is conventionally understood, the controller logic 1008 can receive binary type inputs (e.g., switches, photo eyes, etc.) and generate binary type outputs (e.g., motor contacts, solenoid valves, lamp actuations, etc.). For example, in such an implementation, the user interface 1026 can entail at least in part push button controls and lamps. More recent developments for controller logic 1008 can include RS232 serial devices with cathode ray tube (CRT) screens and keyboards that enable dialog screens and data display along with printers for generating reports. Barcode scanning can detect items processed by the material handling system 1000. More recently, wired and wireless communication within the material handling system 1000 and distribution center processing architecture 1002 enable more distributed and remotely isolated implementations. For example, such communication architectures may employ bus couplers such a PROFIBUS and ETHERCAT.

The scan 1016 can be one of many control scans to support increased speeds and complexities for portions of the material handling system 1000. Certain logic is required to be performed during shorter intervals than others and so the scans 1016 can have different periodicities, often selected for convenience to occur as multiples of the shortest duration scan 1016. Examples include scans 1016 of 1 ms and 2 ms for motion control, 10 ms for a merge subsystem, and 211 ms for general conveyor.

The material handling system 1000 can incorporate host communications 1028 to a host system 1030 using serial ports, Ethernet, file transfer protocol (FTP), Transfer Control Protocol/Internet Protocol (TCP/IP), etc. Thereby, the host system 1030 can make decisions for the material handling system 1000. For example, a scanner 1032 can see a barcode. The barcode is sent to the host system 1030, such as via a bridge 1034. The host system 1030 responds with a destination. In response, the material handling system 1000 causes the item with the barcode to go to that destination. Alternatively, the process can entail receiving a batch or download of destinations mapped to barcodes as part of a lookup table (LUT) for reference by the material handling system 1000.

The computer-readable shared memory 1010 can allow execution of an operating system (e.g., Windows, LINX, etc.) 1036 to execute with a real time extension 1038. The real time extension 1038 assures that the machine control logic (controller logic 1008) gets to execute completely on the time schedule required. Variations in the execution schedule are measured in microseconds. This approach assures the kind of precision required for the machine control while retaining access to the power and flexibility of a general purpose Operating system (e.g., Windows). PLCs, which can also be included for machine control, can operate in their own proprietary environments (hardware and software) and are integrated using communications. Data 1040 from these communications is stored in computer-readable shared memory 1010 for use in control decisions and for display on user interface 1026. In an exemplary version, the data 1040 is not controlled by the real time extension 1038. In a similar fashion, other communicating devices 1042 used in the control process (e.g., scales, printers) are connected via a private internal communications bus (e.g., Ethernet) 1044 to the processors 1012. The controller 1014 can also have internal input/output drivers 1045 to interface using specific communication protocols.

The distribution center processing architecture 1002 can include other systems external to the material handling system 1000 that communicate via the bridge 1034, such as a database 1046, a warehouse control system (WCS) 1048, and a warehouse management system (WMS) 1050. In addition, the user interface 1026 can facilitate remote or automated interaction via the user interface 1026, depicted as a local application 1052 and a web application 1054. The controller 1014 can include specific interfaces to support this interaction, such as a user interface data access component 1056 to interact with user interface 1026, middleware routing component 1058 to interface with other external systems. Operating system services 1060 and a device communication component 1062 can also support the communications, such as sensors 1064, actuators 1066, diagnostic systems 1068, and a sorter speed control 1070.

The controller logic 1008 can be functional described as material handling control layers 1072 of software functionality, such as the sortation control 1006, that address certain subsystems within a distribution center: order fulfillment 1074, carousel management 1076, tilt tray/cross belt (TT/CB) control 1078, conveyor control 1080, order manager 1082 and route manager 1084.

While the disclosure has been described with reference to exemplary embodiments, it will be understood by those skilled in the art that various changes may be made and equivalents may be substituted for elements thereof without departing from the scope of the disclosure. In addition, many modifications may be made to adapt a particular system, device or component thereof to the teachings of the disclosure without departing from the essential scope thereof. Therefore, it is intended that the disclosure not be limited to the particular embodiments disclosed for carrying out this disclosure, but that the disclosure will include all embodiments falling within the scope of the appended claims. Moreover, the use of the terms first, second, etc. do not denote any order or importance, but rather the terms first, second, etc. are used to distinguish one element from another.

For example, running average carton length can be used. Then, after a reset, the expected average for the ten minute timer can be used. The same approach can be used for the one (1) minute average for recirculation. Alternatively or in addition, inter-slug gap can be considered in the calculation.

In accordance with various aspects of the disclosure, an element, or any portion of an element, or any combination of elements may be implemented with a "processing system" that includes one or more physical devices comprising processors. Non-limiting examples of processors include microprocessors, microcontrollers, digital signal processors (DSPs), field programmable gate arrays (FPGAs), programmable logic devices (PLDs), programmable logic controllers (PLCs), state machines, gated logic, discrete hardware circuits, and other suitable hardware configured to perform the various functionality described throughout this disclosure. One or more processors in the processing system may execute instructions. A processing system that executes instructions to effect a result is a processing system which is configured to perform tasks causing the result, such as by providing instructions to one or more components of the processing system which would cause those components to perform acts which, either on their own or in combination with other acts performed by other components of the processing system would cause the result. Software shall be construed broadly to mean instructions, instruction sets, code, code segments, program code, programs, subprograms, software modules, applications, software applications, software packages, routines, subroutines, objects, executables, threads of execution, procedures, functions, etc., whether referred to as software, firmware, middleware, microcode, hardware description language, or otherwise. The software may reside on a computer-readable medium. The computer-readable medium may be a non-transitory computer-readable medium. Computer-readable medium includes, by way of example, a magnetic storage device (e.g., hard disk, floppy disk, magnetic strip), an optical disk (e.g., compact disk (CD), digital versatile disk (DVD)), a smart card, a flash memory device (e.g., card, stick, key drive), random access memory (RAM), read only memory (ROM), programmable ROM (PROM), erasable PROM (EPROM), electrically erasable PROM (EEPROM), a register, a removable disk, and any other suitable medium for storing software and/or instructions that may be accessed and read by a computer. The computer-readable medium may be resident in the processing system, external to the processing system, or distributed across multiple entities including the processing system. The computer-readable medium may be embodied in a computer-program product. By way of example, a computer-program product may include a computer-readable medium in packaging materials. Those skilled in the art will recognize how best to implement the described functionality presented throughout this disclosure depending on the particular application and the overall design constraints imposed on the overall system.

"Processor" means devices which can be configured to perform the various functionality set forth in this disclosure, either individually or in combination with other devices. Examples of "processors" include microprocessors, microcontrollers, digital signal processors (DSPs), field programmable gate arrays (FPGAs), programmable logic devices (PLDs), programmable logic controllers (PLCs), state machines, gated logic, and discrete hardware circuits. The phrase "processing system" is used to refer to one or more processors, which may be included in a single device, or distributed among multiple physical devices.

"Instructions" means data which can be used to specify physical or logical operations which can be performed by a processor. Instructions should be interpreted broadly to include, code, code segments, program code, programs, subprograms, software modules, applications, software applications, software packages, routines, subroutines, objects, executables, threads of execution, procedures, functions, hardware description language, middleware, etc., whether encoded in software, firmware, hardware, microcode, or otherwise.

Figure 11:
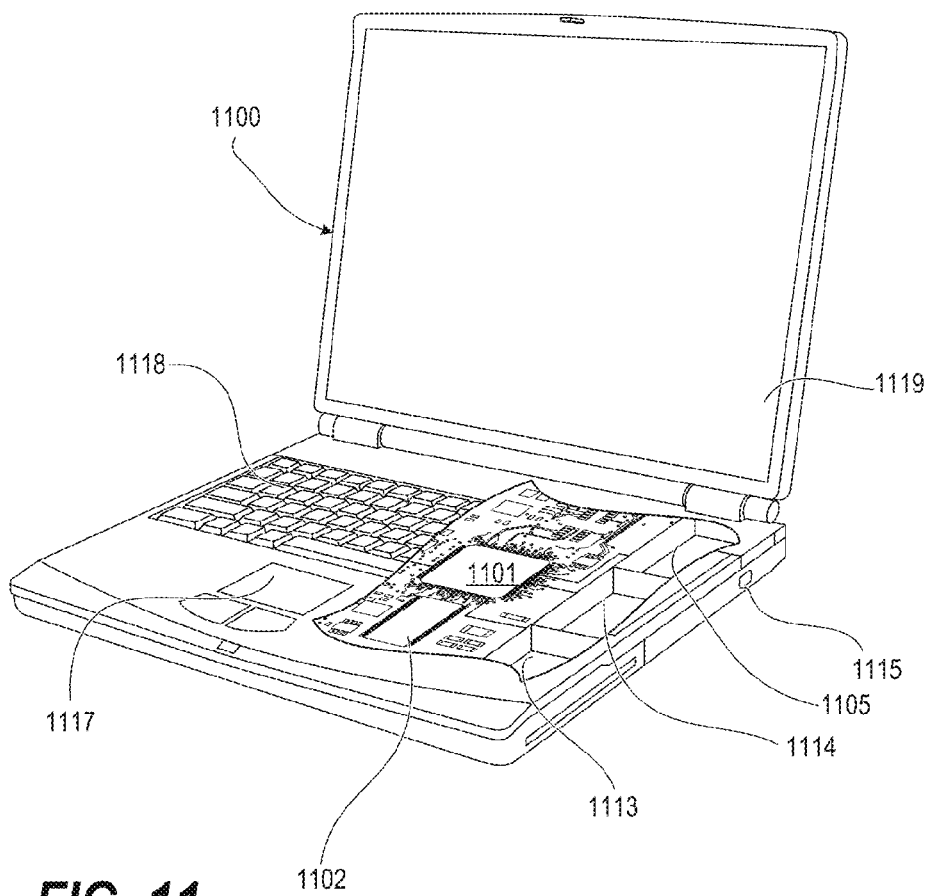
FIG. 11 illustrates a depiction of an isometric view of a laptop computer for executing instructions to perform dual sided sortation from an offset induct, according to one or more embodiments.

The various embodiments may be implemented in any of a variety of computing devices, an example of which is illustrated in FIG. 11. A computing device 1100 will typically include a processor 1101 coupled to volatile memory 1102 and a large capacity nonvolatile memory, such as a disk drive 1105 of Flash memory. The computing device 1100 may also include a floppy disc drive 1113 and a compact disc (CD) drive 1114 coupled to the processor 1101. The computing device 1100 may also include a number of connector ports 1115 coupled to the processor 1101 for establishing data connections or receiving external memory devices, such as a USB or FireWire™ connector sockets, or other network connection circuits for establishing network interface connections from the processor 1101 to a network or bus, such as a local area network coupled to other computers and servers, the Internet, the public switched telephone network, and/or a cellular data network. The computing device 1100 may also include the trackball or touch pad 1117, keyboard 1118, and display 1119 all coupled to the processor 1101.

Figure 12:
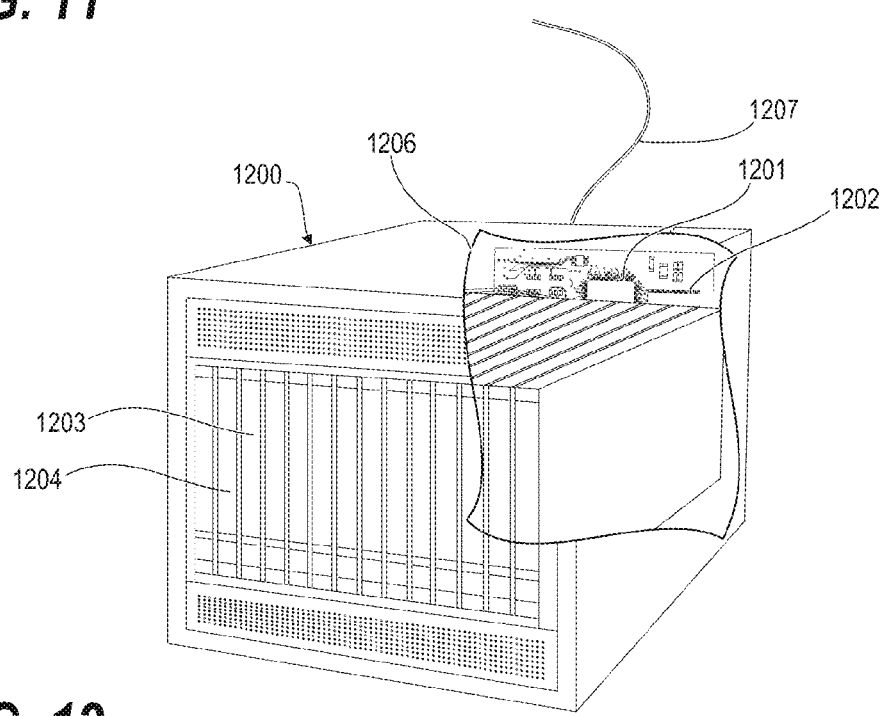
FIG. 12 illustrates a depiction of an isometric view of a server information handling system for executing instructions to perform dual sided sortation from an offset induct, according to one or more embodiments.

The various embodiments may also be implemented on any of a variety of commercially available server devices, such as the server 1200 illustrated in FIG. 12. Such a server 1200 typically includes a processor 1201 coupled to volatile memory 1202 and a large capacity nonvolatile memory, such as a disk drive 1203. The server 1200 may also include a floppy disc drive, compact disc (CD) or DVD disc drive 1204 coupled to the processor 1201. The server 1200 may also include network access ports 1206 coupled to the processor 1201 for establishing network interface connections with a network 1207, such as a local area network coupled to other computers and servers, the Internet, the public switched telephone network, and/or a cellular data network.

Figure 13:
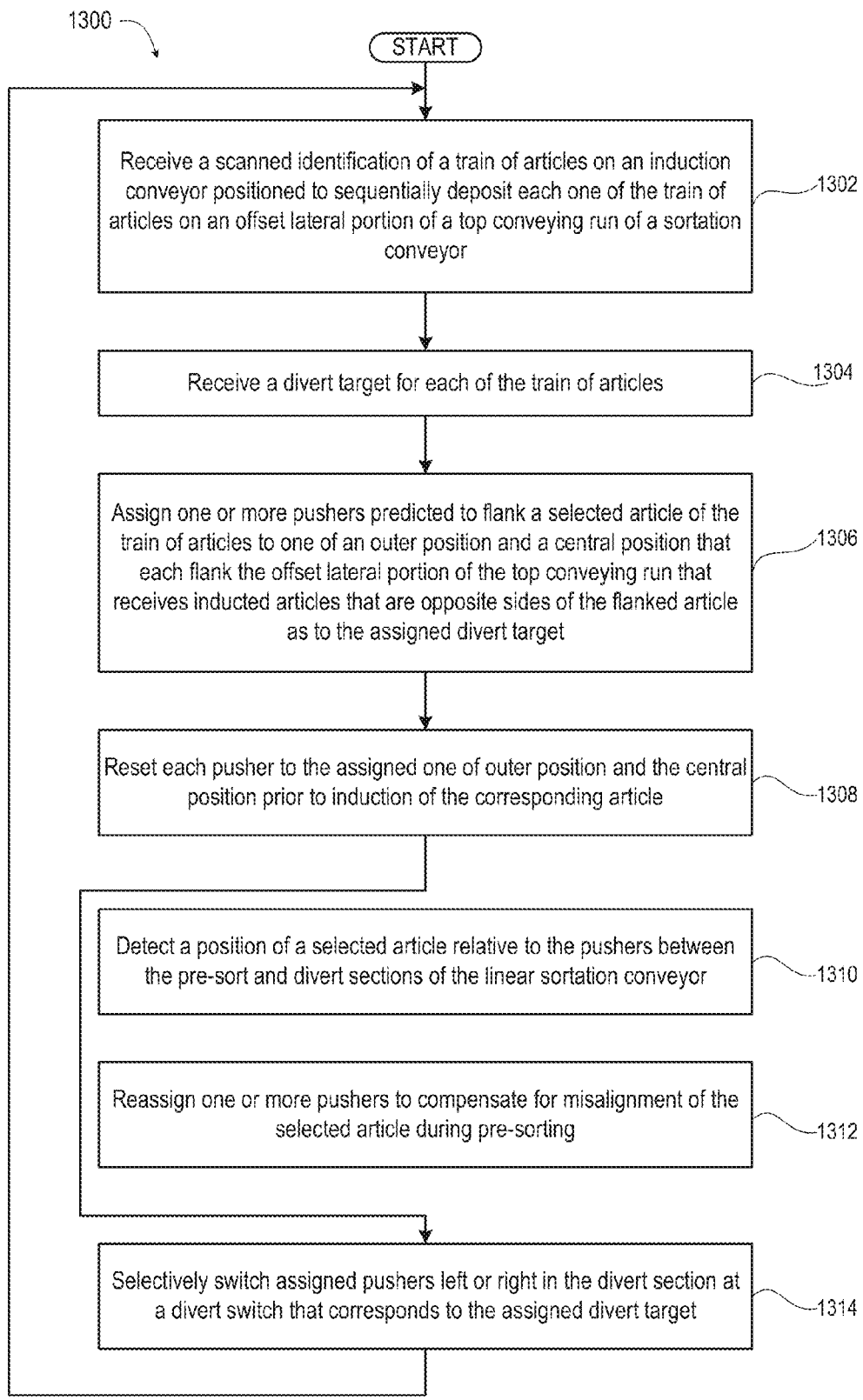
FIG. 13 illustrates a flow diagram of a method of dual sided sortation from an offset induct, according to one or more embodiments.

FIG. 13 illustrates a method 1300 of dual sided sortation of articles on a linear sortation conveyor with articles inducted offset. The articles are presorted to respective lateral sides of the sortation conveyor for subsequent diverting at high speed without tumbling. The pre-sort and the diverting is performed by pushers positioned in proximity to the articles and following a sinusoidal arcuate path that accelerates the articles smoothly without sudden impacts. In one or more embodiments, the method 1300 includes controller receiving a scanned identification of a train of articles on an induction conveyor positioned to sequentially deposit each one of the train of articles on an offset lateral portion of a top conveying run of a sortation conveyor (block 1302). The sortation conveyor includes (i) an elongate frame comprising a pair of lateral side frames; (ii) an endless apron supported for longitudinal movement on the elongate frame to define a top conveying run and a bottom return run; (iii) more than one pusher received for lateral movement across the endless apron transverse to the longitudinal movement, each pusher having a pin extending below the top conveying run; (iv) more than one divert target positioned respectively along each lateral side of the elongate frame to receive articles diverted by one or more pusher from the distally-moving top conveying run of the apron; and (v) a pin guide assembly coupled between the elongate frames, and having an upstream pre-sort section and a downstream divert section that are upwardly presented to selectively receive the pin of respective more than one pusher.

The method 1300 includes controller receiving identification of a divert target for each of the train of articles (block 1304). The method 1300 includes controller assigning one or more pushers predicted to flank a selected article of the train of articles to one of an outer position and a central position that each flank the offset lateral portion of the top conveying run that receives inducted articles that are opposite sides of the flanked article as to the assigned divert target (block 1306). The method 1300 includes controller resetting each pusher to the assigned one of outer position and the central position prior to induction of the corresponding article (block 1308). The pre-sort section guides pushers in the outer position to the central position while moving the flanked article to an opposite lateral portion of the top conveying run. In one or more embodiments, the method 1300 further refines the pre-sorting by utilizing machine vision confirmation of article pre-sorting with shoe reassignment to compensate for misalignments. To this end, the method 1300 includes detecting a position of a selected article relative to the pushers between the pre-sort and divert sections of the linear sortation conveyor (block 1310). The method 1300 includes reassigning one or more pushers to compensate for misalignment of the selected article during pre-sorting (block 1312). The method 1300 includes controller selectively switching assigned pushers left or right in the divert section at a divert switch that corresponds to the assigned divert target (block 1314). Then method 1300 returns to block 1302 to continuously receive and divert articles.

While the present embodiment of the invention has been illustrated by description of several embodiments and while the illustrative embodiments have been described in considerable detail, it is not the intention of the applicant to restrict or in any way limit the scope of the appended claims to such detail. Additional advantages and modifications may readily appear to those skilled in the art.

What is claimed is:

1. A sortation conveyor comprising:
   an elongate frame comprising a pair of lateral side frames;
   an endless apron supported for longitudinal movement on the elongate frame to define a top conveying run and a bottom return run;
   an induction conveyor positioned to deposit articles on an offset lateral portion of the top conveying run;
   more than one pusher received for lateral movement across the endless apron transverse to the longitudinal movement, each pusher having a pin extending below the top conveying run;
   more than one divert target positioned respectively along each lateral side of the elongate frame to receive articles diverted by one or more pusher from the distally-moving top conveying run of the apron; and
   a pin guide assembly coupled between the elongate frames, upwardly presented to selectively receive the pin of respective more than one pusher, and comprising an upstream pre-sort section that positions the articles selectively from the offset lateral portion to an opposite lateral portion of the top conveying run and the pin guide assembly comprising a downstream divert section that selectively diverts the articles left or right to the assigned divert target,
   wherein the pre-sort section laterally repositions selected articles with an increasing acceleration to mitigate article sliding and misalignment on the top conveying surface proximate to the pushers,
   wherein the divert section laterally diverts assigned articles with an increasing acceleration to mitigate impact and tumbling of the articles, and
   wherein the pre-sort section of the pin guide assembly comprises:
      a reset mechanism to selectively position each pusher in one of an outer position and a central position that each flank the offset lateral portion of the top conveying run that receives inducted articles; and
      a side shifting guide that receives a pusher in the outer position and guides the pusher and a flanked article to the opposite lateral position of the top conveying run.

2. The sortation conveyor of claim 1 wherein the side shifting guide comprises a sinusoidal curved path that smoothly accelerates and then decelerates the flanked article for accurately depositing without jostling of the flanked article on the opposite lateral portion.

3. The sortation conveyor of claim 2, wherein the divert section of the pin guide assembly comprises:
   a plurality of switches to selectively engage a pin of a selected pusher on the top conveying run;
   a plurality of divert guide paths, each respective divert guide path of the plurality of divert guide paths disposed downstream of a respective associated one of the plurality of switches to engage the pin switched by the associated switch, each respective divert guide path comprising an arcuate portion having an entrance at a first angle that smoothly increases to a larger second angle to the longitudinal movement, the arcuate portion laterally accelerating the selected, flanked articles without any abrupt impacts,
   wherein the presort section positions the flanked article laterally proximate to the selected pusher.

4. The sortation conveyor of claim 3, wherein the plurality of switches comprises a nested left and right switch pair for reduced longitudinal footprint.

5. A sortation conveyor comprising:
   an elongate frame comprising a pair of lateral side frames;
   an endless apron supported for longitudinal movement on the elongate frame to define a top conveying run and a bottom return run;
   a induction conveyor positioned to deposit articles on an offset lateral portion of the top conveying run;
   more than one pusher received for lateral movement across the endless apron transverse to the longitudinal movement, each pusher having a pin extending below the top conveying run;
   more than one divert target positioned respectively along each lateral side of the elongate frame to receive articles diverted by one or more pusher from the distally-moving top conveying run of the apron; and
   a pin guide assembly coupled between the elongate frames, upwardly presented to selectively receive the pin of respective more than one pusher, and comprising an upstream pre-sort section that positions the articles selectively from the offset lateral portion to an opposite lateral portion of the top conveying run and the pin guide assembly comprising a downstream divert section that selectively diverts the articles left or right to the assigned divert target,
   wherein the pre-sort section laterally repositions selected articles with an increasing acceleration to mitigate article sliding and misalignment on the top conveying surface proximate to the pushers,
   wherein the divert section laterally diverts assigned articles with an increasing acceleration to mitigate impact and tumbling of the articles, and
   wherein the divert target comprises a distally-hinged discharge chute having a proximal end guided for upward movement by sliding engagement of a downwardly extending chute pin to a base guide.

6. The sortation conveyor of claim 5, wherein the downwardly extending chute pin comprises a lower necked shape dimensioned for frangible disconnection to avoid damage to other components during impact to the proximal end of the discharge chute.

7. The sortation conveyor of claim 5, further comprising a transition member between the top conveying surface and the proximal end of the discharge conveyor, the transition member formed of wood to avoid warping and grooved for frangible disconnection to avoid damage to other components during impact.

8. A sortation conveyor comprising:
   an elongate frame comprising a pair of lateral side frames;
   an endless apron supported for longitudinal movement on the elongate frame to define a top conveying run and a bottom return run;
   an induction conveyor positioned to deposit articles on an offset lateral portion of the top conveying run;

more than one pusher received for lateral movement across the endless apron transverse to the longitudinal movement, each pusher having a pin extending below the top conveying run;

more than one divert target positioned respectively along each lateral side of the elongate frame to receive articles diverted by one or more pusher from the distally-moving top conveying run of the apron;

a pin guide assembly coupled between the elongate frames, upwardly presented to selectively receive the pin of respective more than one pusher, and comprising an upstream pre-sort section that positions the articles selectively from the offset lateral portion to an opposite lateral portion of the top conveying run and the pin guide assembly comprising a downstream divert section that selectively diverts the articles left or right to the assigned divert target, and a position detection system to detect a relative longitudinal position of a selected flanked article on the top conveying run of the endless apron, wherein the sortation controller adjusts selection of the one or more reset pushers to compensate for the detected relative position, wherein the pre-sort section laterally repositions selected articles with an increasing acceleration to mitigate article sliding and misalignment on the top conveying surface proximate to the pushers, wherein the divert section laterally diverts assigned articles with an increasing acceleration to mitigate impact and tumbling of the articles.

9. The sortation conveyor of claim 8, wherein the position detection system comprises a machine vision system that detects a geometric shape having an orientation and relative distance to the one or more reset pushers.

10. A sortation conveyor comprising:
an elongate frame comprising a pair of lateral side frames;
an endless apron supported for longitudinal movement on the elongate frame to define a top conveying run and a bottom return run;
an induction conveyor positioned to deposit articles on an offset lateral portion of the top conveying run;
more than one pusher received for lateral movement across the endless apron transverse to the longitudinal movement, each pusher having a pin extending below the top conveying run;
more than one divert target positioned respectively along each lateral side of the elongate frame to receive articles diverted by one or more pusher from the distally-moving top conveying run of the apron; and
a pin guide assembly coupled between the elongate frames, upwardly presented to selectively receive the pin of respective more than one pusher, and comprising an upstream pre-sort section that positions the articles selectively from the offset lateral portion to an opposite lateral portion of the top conveying run and the pin guide assembly comprising a downstream divert section that selectively diverts the articles left or right to the assigned divert target,
wherein the pre-sort section laterally repositions selected articles with an increasing acceleration to mitigate article sliding and misalignment on the top conveying surface proximate to the pushers,
wherein the divert section laterally diverts assigned articles with an increasing acceleration to mitigate impact and tumbling of the articles, and
wherein the pin guide assembly further comprises a calibration gate that selectively and laterally deflects a selected pin laterally from a longitudinal train of pins for calibrating detection of the longitudinal train of pins.

11. A method of dual sided sortation of articles on a linear sortation conveyor, the method comprising:
receiving a scanned identification of a train of articles on an induction conveyor positioned to sequentially deposit each one of the train of articles on an offset lateral portion of a top conveying run of a sortation conveyor, the sortation conveyor comprising (i) an elongate frame comprising a pair of lateral side frames; (ii) an endless apron supported for longitudinal movement on the elongate frame to define a top conveying run and a bottom return run; (iii) more than one pusher received for lateral movement across the endless apron transverse to the longitudinal movement, each pusher having a pin extending below the top conveying run; (iv) more than one divert target positioned respectively along each lateral side of the elongate frame to receive articles diverted by one or more pusher from the distally-moving top conveying run of the apron; and (v) a pin guide assembly coupled between the elongate frames, and having an upstream pre-sort section and a downstream divert section that are upwardly presented to selectively receive the pin of respective more than one pusher;
receiving identification of a divert target for each of the train of articles;
assigning one or more pushers predicted to flank a selected article of the train of articles to one of an outer position and a central position that each flank the offset lateral portion of the top conveying run that receives inducted articles that are opposite sides of the flanked article as to the assigned divert target;
resetting each pusher to the assigned one of outer position and the central position prior to induction of the corresponding article, wherein the pre-sort section guides pushers in the outer position to the central position while moving the flanked article to an opposite lateral portion of the top conveying run; and
selectively switching assigned pushers left or right in the divert section at a divert switch that corresponds to the assigned divert target.

12. The method of claim 11, further comprising selectively triggering a calibration gate that selectively and laterally deflects a selected pin laterally out of downstream engagement by the pin guide assembly for calibrating detection of the longitudinal train of pins.

13. The method of claim 11, further comprising:
detecting a position of a selected article relative to the pushers between the pre-sort and divert sections of the linear sortation conveyor; and
reassigning one or more pushers to compensate for misalignment of the selected article during pre-sorting.

14. A controller of dual sided sortation of articles on a linear sortation conveyor, the controller comprising:
a network interface that communicates with a warehouse management system;
a memory containing parameters identifying divert targets of a dual-sided sortation conveyor;
a device interface in electrical communication with the dual-sided sortation conveyor; and
a processor subsystem in communication with the network interface, the memory, and the device interface, the processor subsystem:
receives a scanned identification of a train of articles on an induction conveyor positioned to sequentially deposit each one of the train of articles on an offset lateral portion of a top conveying run of the sortation conveyor, the sortation conveyor comprising: (i) an elongate frame comprising a pair of lateral side frames; (ii) an endless apron supported for longitudinal movement on the elongate frame to define a top conveying run and a bottom return run; (iii) more than one pusher received for lateral movement across the endless apron transverse to the longitudinal movement, each pusher having a pin extending below the top conveying run; (iv) more than one divert target positioned respectively along each lateral side of the elongate frame to receive articles diverted by one or more pusher from the distally-moving top conveying run of the apron; and (v) a pin guide assembly coupled between the elongate frames, and having an upstream pre-sort section and a downstream divert section that are upwardly presented to selectively receive the pin of respective more than one pusher;

receives identification of a divert target for each of the train of articles;

assigns one or more pushers predicted to flank a selected article of the train of articles to one of an outer position and a central position that each flank the offset lateral portion of the top conveying run that receives inducted articles that are opposite sides of the flanked article as to the assigned divert target;

resets each pusher to the assigned one of outer position and the central position prior to induction of the corresponding article, wherein the pre-sort section guides pushers in the outer position to the central position while moving the flanked article to an opposite lateral portion of the top conveying run; and selectively switches assigned pushers left or right in the divert section at a divert switch that corresponds to the assigned divert target.

15. The controller of claim 14, wherein the controller selectively triggers a calibration gate that selectively and laterally deflects a selected pin laterally out of downstream engagement by the pin guide assembly for calibrating detection of the longitudinal train of pins.

16. The controller of claim 14, wherein the controller:

detects a position of a selected article relative to the pushers between the pre-sort and divert sections of the linear sortation conveyor; and reassigns one or more pushers to compensate for misalignment of the selected article during pre-sorting.

\* \* \* \* \*